United States Patent
Pesyna et al.

(10) Patent No.: US 9,517,843 B2
(45) Date of Patent: Dec. 13, 2016

(54) GENERATOR FOR FLIGHT VEHICLE

(71) Applicant: Rolls-Royce North American Technologies, Inc., Indianapolis, IN (US)

(72) Inventors: Kenneth M. Pesyna, Carmel, IN (US); Robert A. Ress, Jr., Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 118 days.

(21) Appl. No.: 14/095,613

(22) Filed: Dec. 3, 2013

(65) Prior Publication Data

US 2014/0263824 A1    Sep. 18, 2014

Related U.S. Application Data

(60) Provisional application No. 61/778,594, filed on Mar. 13, 2013.

(51) Int. Cl.
| | | |
|---|---|---|
| *B64D 41/00* | (2006.01) |
| *B64D 27/20* | (2006.01) |
| *B64D 33/00* | (2006.01) |
| *B64D 33/02* | (2006.01) |
| *F01D 15/10* | (2006.01) |

(52) U.S. Cl.
CPC .............. *B64D 41/00* (2013.01); *B64D 27/20* (2013.01); *B64D 33/00* (2013.01); *B64D 33/02* (2013.01); *F01D 15/10* (2013.01)

(58) Field of Classification Search
CPC . B64D 2033/0213; B64D 41/00; B64D 33/02; B64D 33/00; B64D 27/20
See application file for complete search history.

(56) References Cited

U.S. PATENT DOCUMENTS

| | | | | |
|---|---|---|---|---|
| 3,489,377 A | * | 1/1970 | Wright | F02C 7/045 137/15.1 |
| 5,299,760 A | | 4/1994 | Finch et al. | |
| 5,683,061 A | | 11/1997 | Hardy et al. | |
| 6,247,668 B1 | * | 6/2001 | Reysa | B64D 41/00 244/53 B |
| 6,467,725 B1 | | 10/2002 | Coles et al. | |
| 7,468,561 B2 | | 12/2008 | Kern et al. | |

(Continued)

FOREIGN PATENT DOCUMENTS

| | | |
|---|---|---|
| GB | 793782 A | 4/1958 |
| GB | 1212875 A | 11/1970 |

OTHER PUBLICATIONS

Angela C. Rabe, Effectiveness of a Serpentine Inlet Duct Flow Control Scheme at Design and Off-Design Simulated Flight Conditions, Dissertation submitted to Virginia Polytechnic Institute and State University, Aug. 1, 2003, Blacksburg, Virginia.

(Continued)

*Primary Examiner* — Brian M O'Hara
(74) *Attorney, Agent, or Firm* — Barnes & Thornburg, LLP (57) ABSTRACT

A flight vehicle includes a fuselage and a gas turbine engine. The gas turbine engine is coupled to the fuselage to provide thrust when air surrounding the flight vehicle is admitted to the gas turbine engine and combusted with fuel. The flight vehicle further includes a generator coupled to the gas turbine engine to provide power to equipment included in the vehicle.

17 Claims, 4 Drawing Sheets

FIG. 2

(56) References Cited

U.S. PATENT DOCUMENTS

| | | |
|---|---|---|
| 7,514,810 B2 | 4/2009 | Kern et al. |
| 7,605,483 B2 | 10/2009 | Kern et al. |
| 7,841,163 B2 | 11/2010 | Welch et al. |
| 7,926,287 B2 | 4/2011 | Ullyott et al. |
| 7,942,079 B2 | 5/2011 | Russ |
| 8,039,983 B2 | 10/2011 | Cote et al. |
| 8,198,744 B2 | 6/2012 | Kern et al. |
| 2012/0128487 A1 | 5/2012 | Eames |
| 2012/0133150 A1 | 5/2012 | Dooley et al. |
| 2013/0181088 A1* | 7/2013 | Casado Montero ... B64D 41/00 244/50 |

OTHER PUBLICATIONS

International Search Report and Opinion for PCT/US2013/072764, Mailed Mar. 3, 2014, 10 Pages.

* cited by examiner

GENERATOR FOR FLIGHT VEHICLE

CROSS REFERENCE TO RELATED APPLICATIONS

This application claims priority to and the benefit of U.S. Provisional Patent Application No. 61/778,594, filed 13 Mar. 2013, the disclosure of which is now incorporated herein by reference.

FIELD OF THE DISCLOSURE

The present disclosure relates generally to flight vehicles, and more specifically to gas turbine power generation for flight vehicles.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines may include a one or more rotating spools which rotate relative to one another. In one example, a gas turbine engine includes a Low Pressure (LP) spool and a High Pressure (HP) spool. The LP spool interconnects the LP turbine and the LP compressor to rotate together. The HP spool interconnects the HP turbine and the HP compressor to rotate together. As a result the LP spool is configured to pass through the HP spool so that the spools may rotate independently of one another.

Flight vehicles powered by gas turbine engines typically use an engine driven generator for aircraft electrical power needs when underway. Turbofan engines typically locate the generator on an accessory gearbox mounted on the exterior of the engine. The gearbox is driven through an integrated towershaft coupled to the HP spool. In another example, a generator may be embedded in the engine. A generator may be embedded on the LP spool or as part of an embedded HP generator/starter.

Embedded generators pose challenges for several reasons. One challenge is that space available below the aerodynamic flowpath limits the physical size and power available from generators. Another challenge is that the operating environments of embedded generators includes high temperatures, presence of oil and oil mist, engine generated vibrations, etc. Still yet another challenge is that embedded generators require revised durability and maintenance philosophies. Another challenge with embedded generators is that access for maintenance and repair may require complete removal of the engine from the aircraft fuselage which can be time intensive and costly.

SUMMARY

The present application discloses one or more of the features recited in the appended claims and/or the following features which, alone or in any combination, may comprise patentable subject matter.

A flight vehicle may include a fuselage, a gas turbine engine, and a generator unit. The gas turbine engine may be located in a space formed in the fuselage of the flight vehicle between a nose of the fuselage and a tail of the fuselage. The generator unit may be coupled to the gas turbine engine to rotate therewith and provide electrical power to the flight vehicle while in flight.

In some embodiments, the generator unit may be spaced apart from the gas turbine engine. The generator may be located between the gas turbine engine and the nose of the fuselage.

In some embodiments, the flight vehicle may further include an air inlet duct coupled to the gas turbine engine and an air inlet. The air inlet duct may be formed to include an air passageway therein. The air inlet may define an aperture opening into the passageway to communicate air surrounding the flight vehicle through the aperture, through the passageway, and into the gas turbine engine for combustion.

In some embodiments, the air inlet duct and the fuselage may define a generator-receiving space therebetween. The generator unit may be located in the generator-receiving space between the air inlet duct and the fuselage.

In some embodiments, the generator unit may be located between a top surface of the fuselage and the air inlet duct.

In some embodiments, the generator-receiving space may be further defined by the top surface of the fuselage.

In some embodiments, the generator unit may be located between a top surface of the fuselage, the bottom surface of the fuselage, and the air inlet duct.

In some embodiments, the generator-receiving space may be further defined by the bottom surface of the fuselage, the top surface of the fuselage, and the air inlet duct.

In some embodiments, the generator unit may be located between a bottom surface of the fuselage and the air inlet duct.

In some embodiments, the generator-receiving space may be further defined by the bottom surface of the fuselage.

In some embodiments, a portion of the generator unit may extend into and lie in the passageway.

In some embodiments, the flight vehicle may further comprise a generator shaft. The generator shaft may be arranged to interconnect and extend between the gas turbine engine and the generator unit to cause rotation of the gas turbine engine to be transferred to the portion of the generator unit.

In some embodiments, the generator shaft may be arranged to extend into the passageway.

In some embodiments, the gas turbine engine may include an LP spool and an HP spool. The generator shaft may be coupled to the LP spool to rotate therewith.

In some embodiments, the flight vehicle further may include a first air inlet duct, a second air inlet duct, and a common duct. The first air inlet duct may be formed to include a first air passageway. The second air inlet duct may be spaced apart from the first air inlet duct and formed to include a second air passageway. The common duct may interconnect the first and second air inlet ducts and the gas turbine engine and may be formed to include a common air passageway therein in fluid communication with the first and second air passageways.

In some embodiments, the first and second air inlet ducts and the fuselage may define a generator-receiving space therebetween. The generator unit may be located in the generator-receiving space between the air inlet duct and the fuselage.

In some embodiments, the flight vehicle may further include a first air inlet and a second air inlet. The first air inlet may define a first aperture opening into the first air passageway. The second air inlet defines a second aperture opening into the second air passageway. The first and second apertures may be configured to communicate air surrounding the flight vehicle through the first and second apertures, through the first and second air passageways, through the common air passageway, and into the gas turbine engine for combustion.

In some embodiments, the first and second air inlet ducts and the fuselage may define a generator-receiving space therebetween. The generator unit may be located in the generator-receiving space between the air inlet duct and the fuselage.

In some embodiments, the generator unit may include a generator and a transmission. The generator may provide the portion of the generator unit that rotates. The generator may be adapted to provide power to equipment included in the flight vehicle. The transmission may be arranged to interconnect the generator and the gas turbine engine to cause the generator to rotate at a first rate while the gas turbine engine rotates at a second rate. The first rate may be different than the second rate.

In some embodiments, the transmission may include a first gear ratio that causes the generator to rotate at the first rate when the gas turbine rotates the second rate.

In some embodiments, the transmission may include a second gear ratio that causes the generator to rotate at the first rate when the gas turbine rotates at a third rate which is slower than the second rate.

In some embodiments, the gas turbine engine may rotate at the third rate when the gas turbine engine is windmilling. The gas turbine engine may be windmilling as a result of the gas turbine not functioning while the flight vehicle may be moving.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
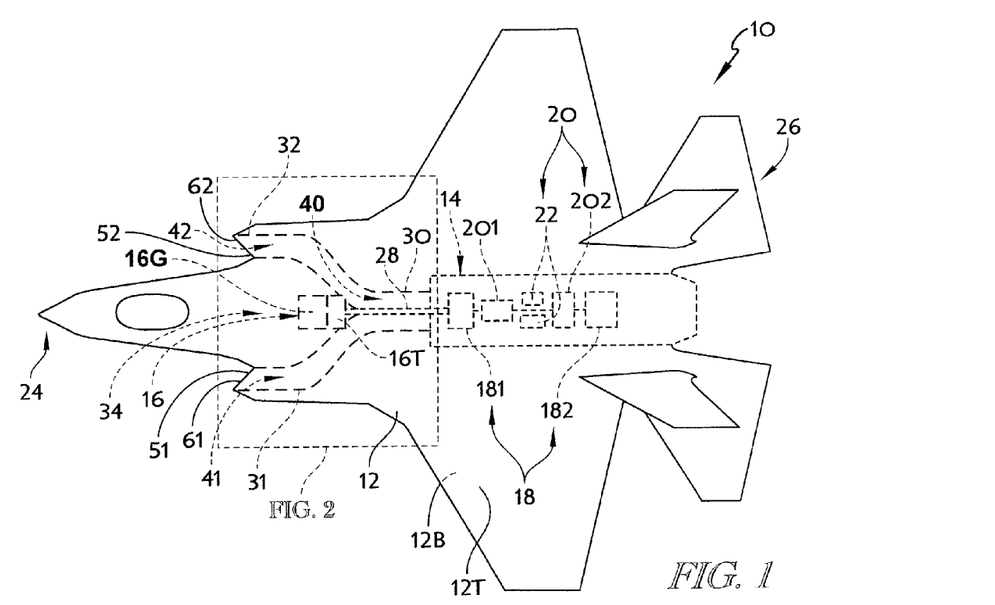
FIG. 1 is a plan view of a first embodiment of a flight vehicle showing that the flight vehicle includes a bifurcated air inlet design feeding a single engine at a rear of the vehicle and showing that a generator shaft is taken off an LP spool of the engine to drive a generator unit located forward of the engine between the two spaced apart inlet ducts included in the bifurcated air inlet.
Figure 2:
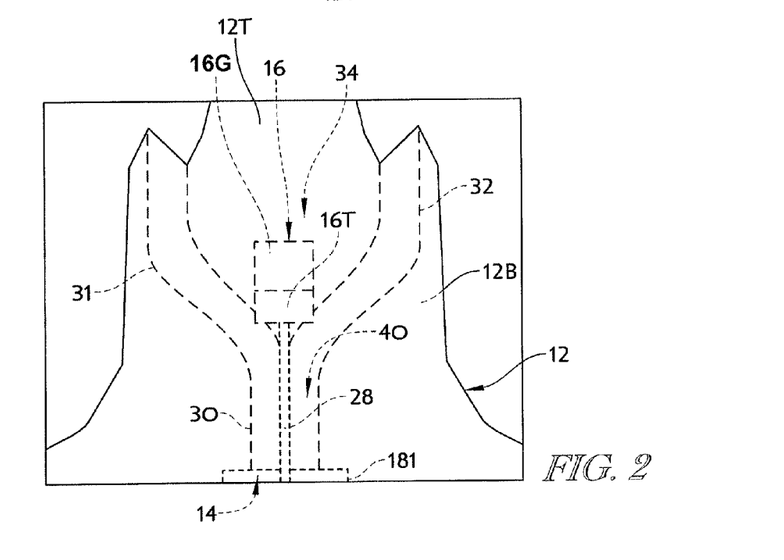
FIG. 2 is an enlarged partial plan view of the flight vehicle of FIG. 1 showing the generator unit located between the two inlet ducts prior to the inlet ducts merging together to establish a common duct and suggesting that the generator shaft extends through the common duct to couple to the LP spool of the engine.

A first embodiment of a flight vehicle 10 is shown, for example, in FIGS. 1 and 2. Flight vehicle 10 includes a fuselage 12, a gas turbine engine 14, and a generator unit 16 as shown in FIGS. 1 and 2. The gas turbine engine 14 is coupled to the fuselage 12 and configured to provide thrust in response to receiving air into the gas turbine engine 14 and combusting the air. The generator unit 16 is coupled to gas turbine engine 14 and configured to provide power to components, such as avionics, included in the flight vehicle 10.

The gas turbine engine 14 includes, for example, a Low Pressure (LP) spool 18, a High Pressure (HP) spool 20, and a combustor 22. The LP spool 18 includes an LP compressor section 181 and an LP turbine section 182 as shown in FIG. 1. The HP spool 20 includes an HP compressor section 201 and an HP turbine section 202 as shown in FIG. 1. The combustor 22 is located between the HP compressor section 201 and the HP turbine section 202. In the illustrative example of FIG. 1, the generator unit 16 is coupled to the LP spool 18 of the gas turbine engine 14 because the LP spool 18 rotates can more readily accommodate the large power demands required by modern flight vehicles.

As air flows into the engine, the LP compressor section 181 pre-compresses the air and delivers it to the HP compressor section 201 where the HP compressor section 201 further compresses the LP air to establish HP air. The HP air then mixes with fuel in the combustor 22 where the air/fuel mixture is combusted to form combustion products. The combustion products are then passed through, in series, the HP turbine section 202 and LP turbine section 182 where work is extracted to cause the LP compressor section 181, the HP compressor section 201, and portions of the generator unit 16 to rotate.

The gas turbine engine as described is referred to as a two spool turbojet engine. In a turbofan engine, the LP compressor section 181 is referred to as a fan section. Air discharged from the fan section is split into two streams. A bypass stream flows around a core of the engine that includes the HP compressor section 201, the combustor, 22, HP turbine section 202, and LP turbine section 182 and produces thrust. A core stream flows into the HP compressor section 202.

As shown, for example, in FIGS. 1 and 2, flight vehicle 10 includes a nose 24 and a tail 26. The gas turbine engine 14 is located between the nose 24 and the tail 26 of the flight vehicle and nearer the tail 26. The generator unit 16 is located in spaced-apart relation to the gas turbine engine 14 between the gas turbine engine 14 and the nose 24 of the flight vehicle 10. The flight vehicle 10 further includes a generator shaft 28 arranged to extend between and interconnect the generator unit 16 and the gas turbine engine 14 as shown in FIG. 2.

The flight vehicle 10 further includes a first air inlet duct 31, a second air inlet duct 32, and a common air inlet duct 30 as shown in FIG. 1. The common air inlet duct 30 interconnects both the first and second air inlet ducts 31, 32 and the gas turbine engine 14. The first air inlet duct 31 is formed to include a first air passageway 41 therein. The second air inlet duct 32 is formed to include a second air passageway 42 therein. The common air inlet duct 30 is formed to include a common air passageway 40 therein in fluid communication with the first and second air passageways 41, 42.

The flight vehicle 10 further includes a first air inlet 51 and a second air inlet 52 spaced apart laterally from the first air inlet 51 as shown in FIG. 1. The first air inlet 51 defines a first aperture 61 opening into the first air passageway 41 to communicate air surrounding the flight vehicle 10 through the first aperture 61, through the first air passage way 41, through the common air passageway 40, and into the gas turbine engine 14 for combustion. The second air inlet 52 defines a second aperture 62 opening into the second air passageway 42 to communicate air surrounding the flight vehicle 10 through the second aperture 62, through the second air passage way 42, through the common air passageway 40, and into the gas turbine engine 14 for combustion.

Together, the fuselage 12 and the air inlet ducts 31, 32 cooperate together to define a generator-receiving space 34 as shown in FIGS. 1 and 2. In more detail, the generator-receiving space 34 is further defined by a top surface 12T and a bottom surface 12B of the fuselage 12. The generator-receiving space 34 is located between the air inlet ducts 31, 32 (also called a bifurcated air inlet). The generator shaft 28 extends through the common air inlet duct 30 to couple to the LP spool 18 of the gas turbine engine 14.

In one example, the air inlet ducts 31, 32 and common air inlet duct 30 are shaped to surround the generator unit 16 so as to block the communication of air from interacting with the generator unit 16. In another example, portions of the generator unit 16 or the entire generator unit 16 may be located in the air passageways 40, 41, 42. In still yet another example, a heat exchanger included in the generator unit 16 may be arranged to extend into the air passageways 40, 41, 42 to cause the air to act as a heat sink for heat generated by the generator unit 16.

As shown in FIG. 2, the generator unit 16 includes a generator 16G and a transmission 16T. The generator 16G provides the portion of the generator unit 16 that rotates with the gas turbine engine 14. The transmission 16T is arranged to interconnect the generator 16G and the gas turbine engine 14 to cause the generator to rotate at a first rate while the gas turbine rotates at a different second rate.

In one example, the transmission 16T includes a first gear ratio and a second gear ratio. The first gear ratio provides for rotation of the generator 16G at the first rate while the LP spool 18 rotates at the second rate. The second gear ratio provides for rotation of the generator 16G at the second rate while the LP spool 18 rotates at a third rate which is slower than the second rate. The LP spool 18 may rotate at the third slower rate when the gas turbine engine 14 is windmilling. The gas turbine engine 14 may windmill when the gas turbine engine 14 is in an engine out situation and the flight vehicle 10 is still moving through the air. As a result, the generator unit 16 may be used in emergencies in place of an emergency Ram Air Turbine (RAT) minimizing cost, weight, and complexity of the flight vehicle 10. In another example, the transmission 16T may include a continuously variable speed ratio so that the generator 16G may run at a constant speed over a range of engine LP spool speeds.

Figure 3:
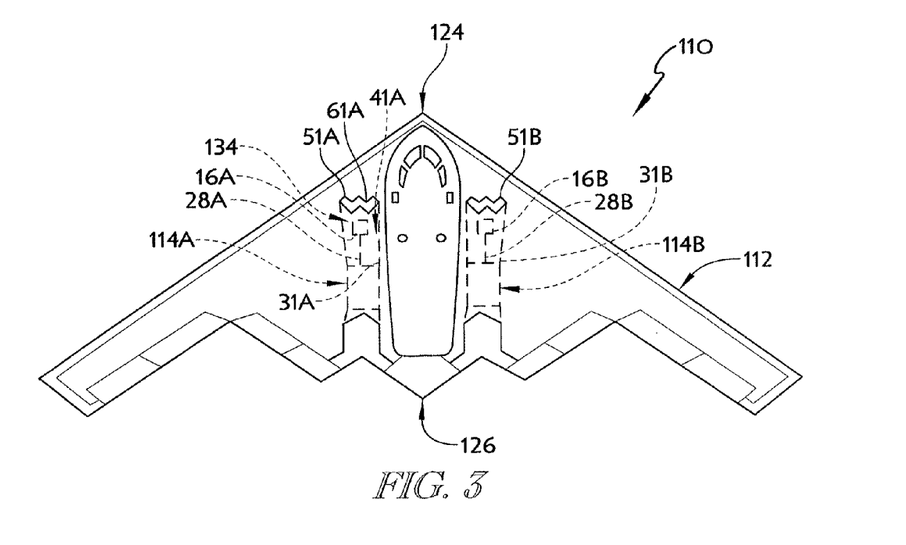
FIG. 3 is a plan view of a second embodiment of a flight vehicle suggesting that the flight vehicle includes two separate above-the-wing inlets opening into an associated serpentine inlet duct (in phantom) that feeds an associated engine (in phantom)
Figure 4:
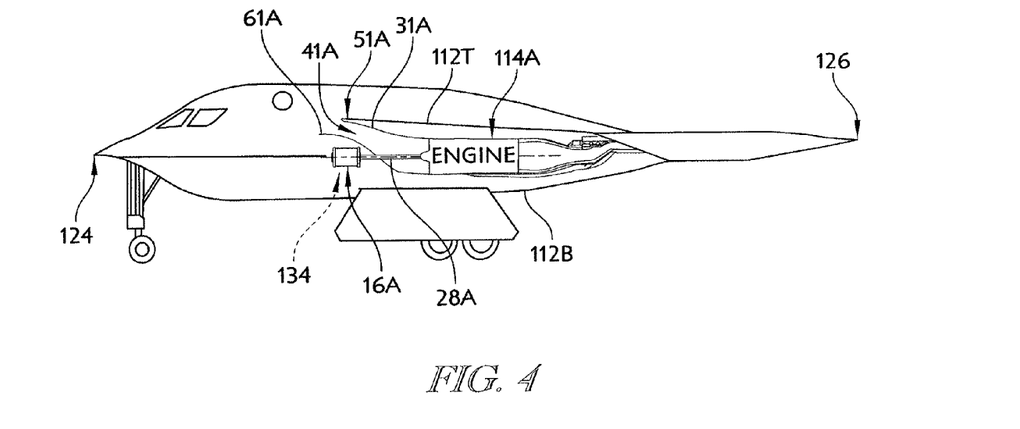
FIG. 4 is an elevation view of the flight vehicle of FIG. 3 with portions broken away to show a generator unit located below the above-the-wing inlet and associated serpentine inlet duct and coupled to an LP spool of the engine by a generator shaft extending through the serpentine inlet duct.
Figure 5:
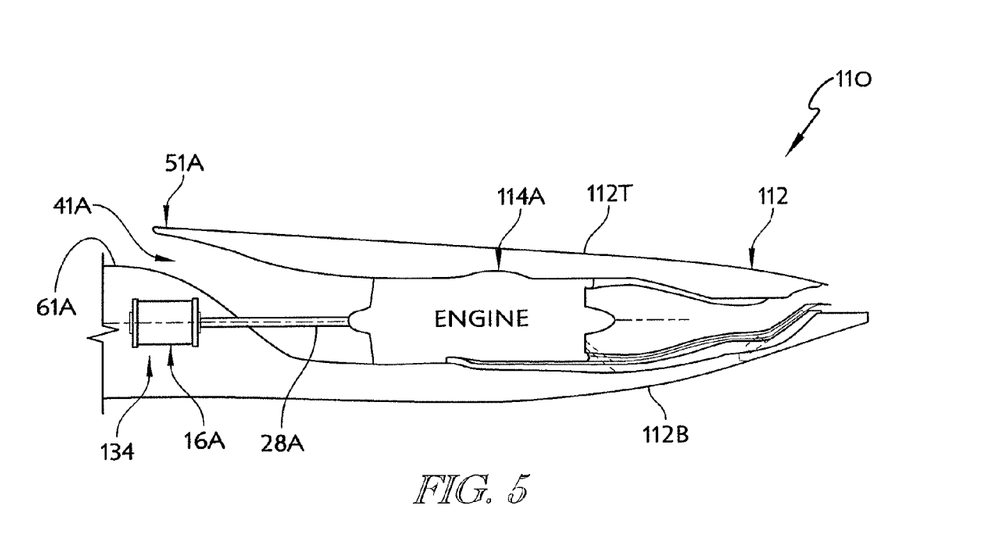
FIG. 5 is an enlarged partial plan view of the flight vehicle of FIG. 4 showing the generator unit located below the serpentine inlet duct and the generator shaft extending through the serpentine inlet duct to interconnect the generator unit and the LP spool of the engine.

Another embodiment of a flight vehicle 110 is shown, for example, in FIGS. 3-5. Flight vehicle 110 includes a fuselage 112, two gas turbine engines 114A, 114B, and two generator units 16A, 16B as shown in FIGS. 3-5. The gas turbine engines 114A, 114B are coupled to the fuselage 112 and configured to provide thrust in response to receiving air into the gas turbine engines 114A, 114B and combusting the air. Each generator unit 16A, 16B is coupled to an associated gas turbine engine 114A, 114B and configured to provide power to components, such as avionics, included in the flight vehicle 110.

The gas turbine engine 114A is substantially the same as the gas turbine engine 114B, and thus, only the gas turbine engine 114A will be discussed in detail. The gas turbine engine 114A includes, for example, a Low Pressure (LP) spool, an Intermediate Pressure (IP) spool, a High Pressure (HP) spool, and a combustor. The LP spool includes an LP compressor section and an LP turbine section. The IP spool includes an IP compressor section and an IP turbine section. The HP spool includes an HP compressor section and an HP turbine section. The combustor is located between the HP compressor section and the HP turbine section. In the illustrative example of FIG. 3, the generator unit 16A is coupled to the LP spool of the gas turbine engine 114A because the LP spool may more readily accommodate the large power demands required by modern flight vehicles.

As shown, for example, in FIGS. 3 and 4, flight vehicle 110 includes a nose 124 and a tail 126. The gas turbine engines 114A, 114B are located between the nose 124 and the tail 126 of the flight vehicle 110 and nearer the tail 126. The generator units 16A, 16B are located in spaced-apart relation to associated gas turbine engines 114A, 114B between the gas turbine engines 114A, 114B and the nose 124 of the flight vehicle 110. The flight vehicle 110 further includes an associated generator shaft 28A, 28B arranged to extend between and interconnect each associated generator unit 16A, 16B and gas turbine engine 114A, 114B as shown in FIG. 3.

The flight vehicle 110 further includes a first air inlet duct 31A, a first air inlet 51A coupled to the first air inlet duct 31A, a second air inlet duct 31B, and a second air inlet 51B coupled to the second air inlet duct 31B. First air inlet duct 31A and first air inlet 51A are associated with first gas turbine engine 114A. First air inlet duct 31A and first air inlet 51A are substantially the same as second air inlet duct 31B and second air inlet 51B, and thus, only first air inlet duct 31A and first air inlet 51A will be discussed in detail.

First air inlet duct 31A is formed to include an air passageway 41A therein. First air inlet 51A is formed to include an aperture 61A opening into air passageway 41A.

The aperture 61A opens into the air passageway 41A to communicate air surrounding the flight vehicle 110 through the aperture 61A, through the air passage way 41A, and into the gas turbine engine 114A for combustion.

Together, the fuselage 112 and the first air inlet duct 31A cooperate together to define a generator-receiving space 134 as shown in FIGS. 4 and 5. In more detail, the generator-receiving space 134 is further defined by a bottom surface 112B of the fuselage 112. The generator-receiving space 134 is located between the air inlet duct 31A (also called a serpentine inlet duct) and the bottom surface 112B of the fuselage. The generator-receiving space 134 is also located below the first air inlet 51A (also called an above-the-wing inlet). The generator shaft 28A extends through the air inlet duct 31A to couple to the LP spool of the gas turbine engine 114A.

In one example, the first air inlet duct 31A is shaped to surround the generator unit 16A so as to block the communication of air from interacting with the generator unit 16A. In another example, portions of the generator unit 16A or the entire generator unit 16A may be located in the air passageway 41A. In still yet another example, a heat exchanger included in the generator unit 16A may be arranged to extend into the air passageway 41A to cause the air to act as a heat sink for heat generated by the generator unit 16A.

Figure 6:
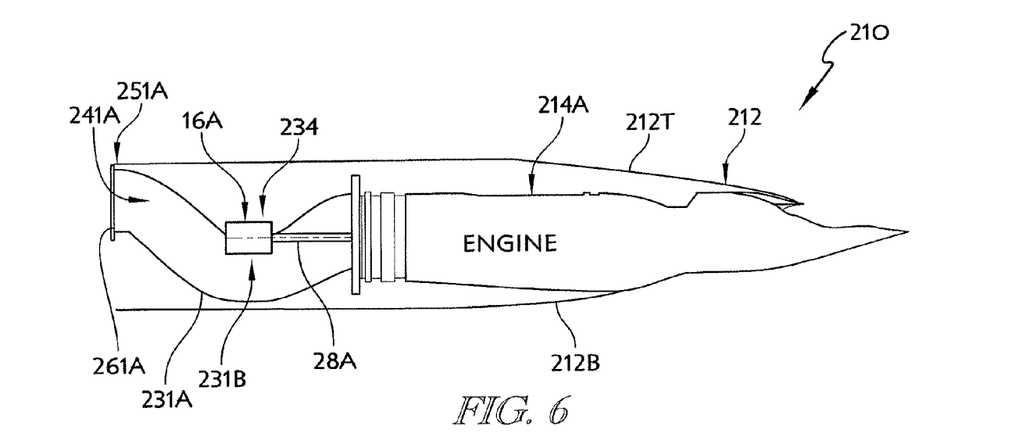
FIG. 6 is another embodiment of an above-the-wing inlet opening into a serpentine inlet duct feeding an engine showing that the generator unit is located at a base of the serpentine inlet duct behind the above-the-wing inlet and that the generator unit is coupled to an LP spool of the engine by a generator shaft extending through the serpentine inlet duct.

A portion of another embodiment of a flight vehicle 210 is shown, for example, in FIG. 6. The flight vehicle includes the generator unit 16A and a gas turbine engine 214A as shown in FIG. 6. The gas turbine engine 214A is located between a nose of the flight vehicle 210 and a tail of the flight vehicle 210. The generator unit 16A is located in spaced-apart relation to the gas turbine engine 214A and between the gas turbine engine 214A and the nose of the flight vehicle 210.

The flight vehicle 210 further includes an air inlet duct 231A coupled to the gas turbine engine 214A and an air inlet 251A coupled to the air inlet duct 231A. The air inlet duct 231A is formed to include an air passageway 241A therein. The air inlet 251A is formed to include an aperture 261A opening into air passageway 241A. The aperture 261A opens into the air passageway 241A to communicate air surrounding the flight vehicle 210 through the aperture 261A, through the air passage way 241A, and into the gas turbine engine 214A for combustion.

Together, the fuselage 212 and the air inlet duct 231A cooperate together to define a generator-receiving space 234 as shown in FIG. 6. In more detail, the generator-receiving space 234 is further defined by a top surface 212T of the fuselage 212 and a base 231B of the air inlet duct 231A. The generator-receiving space 234 is located between the air inlet duct 231A and the top surface 212T of the fuselage 212. The generator-receiving space 234 is also located in spaced-apart relation to the to the air inlet 251A (also called an above-the-wing inlet) between the air inlet 251A and the gas turbine engine 214A. The generator shaft 28A extends through the air inlet duct 231A to couple to the LP spool of the gas turbine engine 214A.

Figure 7:
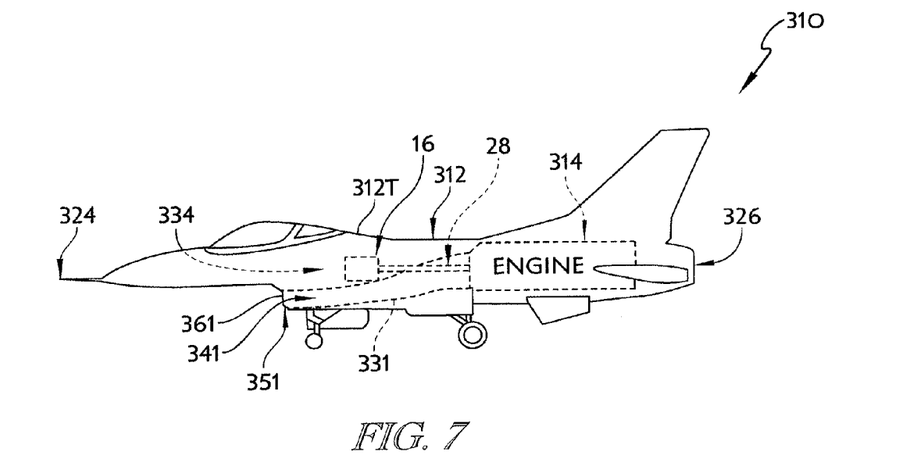
FIG. 7 is an elevation view of a third embodiment of a flight vehicle in accordance with the present disclosure showing that the flight vehicle includes a below-the-wing inlet opening into a serpentine inlet duct (in phantom) that feeds an associated engine (in phantom) at a rear of the flight vehicle.
Figure 8:
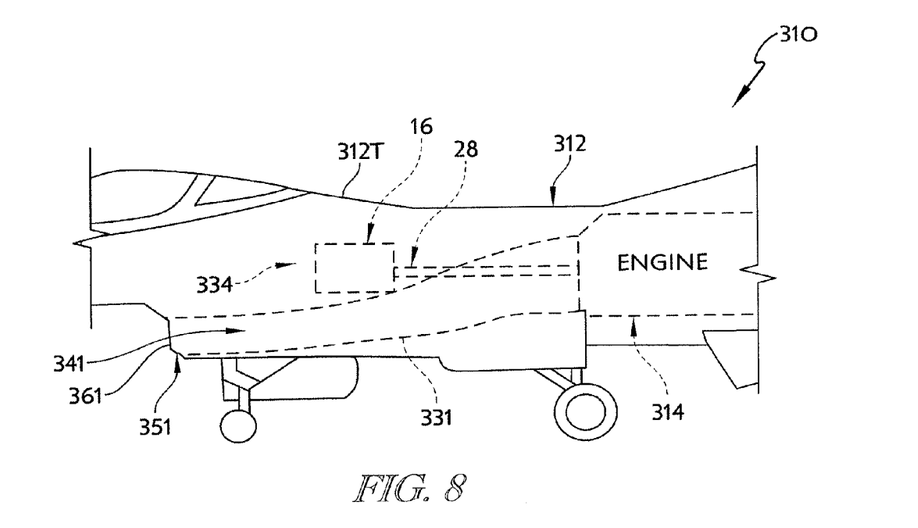
FIG. 8 is an enlarged partial elevation view of the flight vehicle of FIG. 7 showing that a generator unit is located above the serpentine inlet duct in front of the engine and that a generator shaft is arranged to extend through the serpentine inlet duct to interconnect the generator unit and an LP spool included in the engine.

Still yet another embodiment of a flight vehicle 310 is shown, for example, in FIGS. 7 and 8. Flight vehicle 310 includes a fuselage 312, a gas turbine engine 314, and the generator unit 16 as shown in FIGS. 7 and 8. The gas turbine engine 314 is coupled to the fuselage 312 and configured to provide thrust in response to receiving air into the gas turbine engine 314 and combusting the air. The generator unit 16 is coupled to the gas turbine engine 314 and configured to provide power to components, such as avionics, included in the flight vehicle 310.

The gas turbine engine 314 includes, for example, a Low Pressure (LP) spool, a High Pressure (HP) spool, and a combustor. The LP spool includes an LP compressor section and an LP turbine section. The HP spool includes an HP compressor section and an HP turbine section. The combustor is located between the HP compressor section and the HP turbine section. In the illustrative example of FIG. 8, the generator unit 16 is coupled to the LP spool of the gas turbine engine 314 because the LP spool may more readily accommodate the large power demands required by modern flight vehicles.

As shown, for example, in FIGS. 7 and 8, flight vehicle 310 includes a nose 324 and a tail 326. The gas turbine engine 314 is located between the nose 324 and the tail 326 of the flight vehicle 310 and nearer the tail 326. The generator unit 16 is located in spaced-apart relation to the gas turbine engine 314 between the gas turbine engine 314 and the nose 324 of the flight vehicle 310. The flight vehicle 310 further includes the generator shaft 28 which is arranged to extend between and interconnect the generator unit 16 and the gas turbine engine 314 as shown in FIGS. 7 and 8.

The flight vehicle 310 further includes an air inlet duct 331 and an air inlet 351 coupled to the air inlet duct 331. The air inlet duct 331 and air inlet 351 are coupled to the gas turbine engine 314. The air inlet duct 331 is formed to include an air passageway 341 therein. The air inlet 351 is formed to include an aperture 361 opening into air passageway 341. The aperture 361 opens into the air passageway 341 to communicate air surrounding the flight vehicle 310 through the aperture 361, through the air passage way 341, and into the gas turbine engine 314 for combustion.

Together, the fuselage 312 and the air inlet duct 331 cooperate together to define a generator-receiving space 334 as shown in FIGS. 7 and 8. In more detail, the generator-receiving space 334 is further defined by a top surface 312T of the fuselage 312. The generator-receiving space 334 is located between the air inlet duct 331 (also called a serpentine inlet duct) and the top surface 312T of the fuselage 312. The generator unit 16 is located between air inlet 351 and the gas turbine engine 314 as shown in FIG. 8. The generator shaft 28 extends through the air inlet duct 331 to couple to the LP spool of the gas turbine engine 314.

What is claimed is:

1. A flight vehicle comprising:
    a fuselage including a nose and a tail spaced apart from the nose,
    a gas turbine engine located in a space formed in the fuselage and located between the nose and the tail, and
    a generator unit coupled to the gas turbine engine via a generator shaft, at least a portion of the generator shaft located exterior to the generator unit and the gas turbine engine, to cause a portion of the generator unit to rotate therewith, the generator unit being located in spaced-apart relation to the gas turbine engine between the nose and the gas turbine engine,
    wherein the flight vehicle further includes an air inlet duct coupled to the gas turbine engine and formed to include an air passageway therein and an air inlet defining an aperture opening into the air passageway to communicate air surrounding the flight vehicle through the aperture, through the air passageway, and into the gas turbine engine for combustion,
    wherein a portion of the generator unit extends into and lies in the air passageway.

2. The flight vehicle of claim 1, wherein the air inlet duct and the fuselage define a generator-receiving space there between and the generator unit is located in the generator-receiving space between the air inlet duct and the fuselage.

3. The flight vehicle of claim 2, wherein the generator unit is located between a top surface of the fuselage and the air inlet duct.

4. The flight vehicle of claim 3, wherein the generator-receiving space is further defined by the top surface of the fuselage.

5. The flight vehicle of claim 4, wherein the generator unit is located between the top surface of the fuselage, an opposite bottom surface of the fuselage, and the air inlet duct.

6. The flight vehicle of claim 5, wherein the generator-receiving space is further defined by the opposite bottom surface of the fuselage, the top surface of the fuselage, and the air inlet duct.

7. The flight vehicle of claim 2, wherein the generator unit is located between a bottom surface of the fuselage and the air inlet duct.

8. The flight vehicle of claim 7, wherein the generator-receiving space is further defined by the bottom surface of the fuselage.

9. The flight vehicle of claim 1, wherein the generator shaft is arranged to interconnect and extend between the gas turbine engine and the generator unit to cause rotation of the gas turbine engine to be transferred to the portion of the generator unit.

10. The flight vehicle of claim 9, wherein the generator shaft is arranged to extend through air passageway defined by an air inlet duct included in the fuselage.

11. The flight vehicle of claim 10, wherein the gas turbine engine includes an LP spool and an HP spool and the generator shaft is coupled to the LP spool to rotate therewith.

12. The flight vehicle of claim 1, wherein the generator unit includes a generator providing the portion of the generator unit that rotates, the generator is adapted to provide power to equipment included in the flight vehicle, and a transmission arranged to interconnect the generator and the gas turbine engine to cause the generator to rotate at a first rate while the gas turbine engine rotates at a different second rate.

13. The flight vehicle of claim 12, wherein the gas turbine engine rotates at a different third rate when the gas turbine engine is windmilling as a result of the gas turbine engine not functioning while the flight vehicle is moving.

14. The flight vehicle of claim 1, wherein the generator unit includes a generator providing the portion of the generator unit that rotates, the generator is adapted to provide power to equipment included in the flight vehicle, and a continuously variable transmission arranged to interconnect the generator and the gas turbine engine to cause the generator to rotate at a first rate while the gas turbine engine rotates at any rate.

15. A flight vehicle comprising
a fuselage including a nose and a tail spaced apart from the nose,
a gas turbine engine, comprising a compressor and a combustor, located in a space formed in the fuselage and located between the nose and the tail, and
a generator unit coupled to the gas turbine engine to cause a portion of the generator unit to rotate therewith, the generator unit being located in spaced-apart relation to the gas turbine engine between the nose and the gas turbine engine,
wherein the flight vehicle further includes a first air inlet duct formed to include a first air passageway, a second air inlet duct spaced apart from the first air inlet duct and formed to include a second air passageway, and a common duct interconnecting the first and second air inlet ducts and the gas turbine engine and formed to include a common air passageway therein in fluid communication with the first and second air passageways, and a heat exchanger in the generator unit extending into one of the first air passageway, the second air passageway, or the common air passageway.

16. The flight vehicle of claim 15, wherein the first and second air inlet ducts and the fuselage define a generator-receiving space therebetween and the generator unit is located in the generator-receiving space between the first and second air inlet ducts and the fuselage.

17. The flight vehicle of claim 15, further comprising a first air inlet defining a first aperture opening into the first air passageway and a second air inlet defining a second aperture opening into the second air passageway, the first and second apertures being configured to communicate air surrounding the flight vehicle through the first and second apertures, through the first and second air passageways, through the common air passageway, and into the gas turbine engine for combustion.

* * * * *